US010187663B2

(12) United States Patent
Bolz et al.

(10) Patent No.: US 10,187,663 B2
(45) Date of Patent: Jan. 22, 2019

(54) TECHNIQUE FOR PERFORMING VARIABLE WIDTH DATA COMPRESSION USING A PALETTE OF ENCODINGS

(71) Applicant: NVIDIA CORPORATION, Santa Clara, CA (US)

(72) Inventors: Jeffrey A. Bolz, Cedar Park, TX (US); Jeffrey Pool, Durham, NC (US)

(73) Assignee: NVIDIA CORPORATION, Santa Clara, CA (US)

( * ) Notice: Subject to any disclaimer, the term of this patent is extended or adjusted under 35 U.S.C. 154(b) by 91 days.

(21) Appl. No.: 14/831,840

(22) Filed: Aug. 20, 2015

(65) Prior Publication Data
US 2017/0053376 A1    Feb. 23, 2017

(51) Int. Cl.
*G06T 9/00*    (2006.01)
*H04N 19/91*   (2014.01)
*H04N 19/93*   (2014.01)

(52) U.S. Cl.
CPC .......... *H04N 19/91* (2014.11); *G06T 9/005* (2013.01); *H04N 19/93* (2014.11)

(58) Field of Classification Search
CPC ...... H04N 19/13; H04N 19/91; H04N 19/184; H04N 19/93; H03M 7/40; H03M 7/30; H03M 7/3059; G06F 12/0886; G06T 9/00; G06T 9/005
See application file for complete search history.

(56) References Cited

U.S. PATENT DOCUMENTS 6,166,664 A  * 12/2000 Acharya .................. H03M 7/40
                                                            341/59
2008/0273804 A1 * 11/2008 Malewski .............. H04N 1/644
                                                            382/233

* cited by examiner

*Primary Examiner* — Gregory J Tryder
*Assistant Examiner* — Scott E Sonners
(74) *Attorney, Agent, or Firm* — Artegis Law Group, LLP

(57) ABSTRACT

A subsystem configured to encode an RGBA8 data stream assembles sequences of four-byte groups from the data stream. The subsystem decorrelates the red and blue channels, and computes a difference between each four-byte group and an anchor value. The anchor is encoded at full value. The subsystem then assigns each group a five-bit header based on the number and location of non-zero bytes and on the data content of the non-zero bytes within the group. The subsystem favors zero valued bytes. Thus, when a group includes only zero valued bytes, the header is sufficient to encode the group; no data bits are necessary. Further, two successive groups of zero-valued bytes may be encoded as a single header with no data bits, achieving further data reduction. Finally, the subsystem concatenates all the headers with associated data to yield the source data stream compressed to some ratio, e.g. four-to-one.

21 Claims, 7 Drawing Sheets

| | HEADER | NUMBER OF ZERO BYTES | LOCATION OF NON-ZERO BYTES | BIT LENGTH OF DATA |
|---|---|---|---|---|
| 501 | 00000 | 1 NON-ZERO BYTE | 000X | 3 |
| 502 | 00001 | 1 NON-ZERO BYTE | 00X0 | 3 |
| 503 | 00010 | 1 NON-ZERO BYTE | 0X00 | 3 |
| 504 | 00011 | 1 NON-ZERO BYTE | X000 | 3 |
| 505 | 00100 | 1 NON-ZERO BYTE | 000X | 5 |
| 506 | 00101 | 1 NON-ZERO BYTE | 00X0 | 5 |
| 507 | 00110 | 1 NON-ZERO BYTE | 0X00 | 5 |
| 508 | 00111 | 1 NON-ZERO BYTE | X000 | 5 |
| 509 | 01000 | 1 NON-ZERO BYTE | 000X | 8 |
| 510 | 01001 | 1 NON-ZERO BYTE | 00X0 | 8 |
| 511 | 01010 | 1 NON-ZERO BYTE | 0X00 | 8 |
| 512 | 01011 | 1 NON-ZERO BYTE | X000 | 8 |
| | | | | |
| 513 | 01100 | 2 NON-ZERO BYTES | 00XX | 4 |
| 514 | 01101 | 2 NON-ZERO BYTES | 0X0X | 4 |
| 515 | 01110 | 2 NON-ZERO BYTES | 0XX0 | 4 |
| 516 | 01111 | 2 NON-ZERO BYTES | X00X | 4 |
| 517 | 10000 | 2 NON-ZERO BYTES | X0X0 | 4 |
| 518 | 10001 | 2 NON-ZERO BYTES | XX00 | 4 |
| 519 | 10010 | 2 NON-ZERO BYTES | 00XX | 6 |
| 520 | 10011 | 2 NON-ZERO BYTES | 0X0X | 6 |
| 521 | 10100 | 2 NON-ZERO BYTES | 0XX0 | 6 |
| 522 | 10101 | 2 NON-ZERO BYTES | X00X | 6 |
| 523 | 10110 | 2 NON-ZERO BYTES | X0X0 | 6 |
| 524 | 10111 | 2 NON-ZERO BYTES | XX00 | 6 |
| | | | | |
| 525 | 11000 | 3 OR 4 NON-ZERO BYTES | N/A | 2 |
| 526 | 11001 | 3 OR 4 NON-ZERO BYTES | N/A | 3 |
| 527 | 11010 | 3 OR 4 NON-ZERO BYTES | N/A | 4 |
| 528 | 11011 | 3 OR 4 NON-ZERO BYTES | N/A | 5 |
| 529 | 11100 | 3 OR 4 NON-ZERO BYTES | N/A | 6 |
| 530 | 11101 | 3 OR 4 NON-ZERO BYTES | N/A | 8 |
| | | | | |
| 531 | 11110 | 4 ZERO BYTES | N/A | N/A |
| 532 | 11111 | 8 ZERO BYTES | N/A | N/A |

FIGURE 5

|  | SOURCE DATA | ENCODING | HEADER | DATA | # OF DATA BITS |
|---|---|---|---|---|---|
| 601 | 008a5016 | 3 non-zero bytes; 8 bits long | 11101 | 008a5016 | 32 |
| 602 | 00000000 | 4 zero bytes followed by 4 zero bytes | 11111 | no data bits | |
| 603 | 00000000 | | | no data bits | |
| 604 | 0000080f | 2 non-zero bytes at 00xx; 4 bits long | 01100 | 8f | 8 |
| 605 | 00000000 | 4 zero bytes followed by 4 zero bytes | 11111 | no data bits | |
| 606 | 00000000 | | | no data bits | |
| 607 | 00000000 | 4 zero bytes not followed by zero bytes | 11110 | no data bits | |
| 608 | 01100007 | 3 non-zero bytes; 5 bits long | 11011 | 0c007 | 20 |
| 609 | 00000010 | 1 non-zero byte at 000x; 5 bits long | 00100 | 10 | 5 |
| 610 | 000f0200 | 2 non-zero bytes at 0xx0; 4 bits long | 01110 | f2 | 8 |
| 611 | 00000008 | 1 non-zero byte at 000x; 5 bits long | 00100 | 08 | 5 |
| 612 | 00000000 | 4 zero bytes not followed by zero bytes | 11110 | no data bits | |
| 613 | 0000000f | 1 non-zero byte at 000x; 5 bits long | 00100 | 0f | 5 |
| 614 | 07100000 | 2 non-zero bytes at xx00; 6 bits long | 10111 | 1d0 | 12 |
| 615 | 00000010 | 1 non-zero byte at 000x; 5 bits long | 00100 | 10 | 5 |
| 616 | 00000100 | 1 non-zero byte at 00x0; 3 bits long | 00001 | 1 | 3 |
| 617 | 00000000 | 4 zero bytes followed by 4 zero bytes | 11111 | no data bits | |
| 618 | 00000000 | | | no data bits | |
| 619 | 000f0200 | 2 non-zero bytes at 0xx0; 4 bits long | 01110 | f2 | 8 |
| 620 | 00000000 | 4 zero bytes followed by 4 zero bytes | 11111 | no data bits | |
| 621 | 00000000 | | | no data bits | |
| 622 | 0000080f | 2 non-zero bytes at 00xx; 4 bits long | 01100 | 8f | 8 |
| 623 | 00000007 | 1 non-zero byte at 000x; 3 bits long | 00000 | 7 | 3 |
| 624 | 00000010 | 1 non-zero byte at 000x; 5 bits long | 00100 | 10 | 5 |

FIGURE 6

TECHNIQUE FOR PERFORMING VARIABLE WIDTH DATA COMPRESSION USING A PALETTE OF ENCODINGS

BACKGROUND OF THE INVENTION

Field of the Invention

Embodiments of the present invention relate generally to graphics processing and, more specifically, to a technique for performing variable width data compression using a palette of encodings.

Description of the Related Art

In computer systems, in general, and in graphics processing units (GPUs), in particular, evolving technology affords manufacturers the ability to produce processors with increasing density that process data with increasing speed and efficiency. The process of retrieving data from dynamic random access memory (DRAM) into the processor and storing processed data back into DRAM may impose a limitation on achieving maximum benefit from improving technology. Accordingly, efforts to reduce the amount of bandwidth required may lead to more effective processing systems.

Compression algorithms involve encoding the information contained in a stream of digital data in a manner that results in fewer data bits than the original data stream. Fewer data bits results in reduced bandwidth requirements for data transmission and reduced memory capacity requirements. Many compression algorithms exist.

An effective technique for video data compression is known as variable-width differential compression (VDC). VDC is aimed at video data structures composed of 8-bit channels for red, blue, and green in a picture element, or pixel. An additional 8-bit channel is included for a characteristic known as alpha. Alpha is a number that represents the transparency of a pixel, as opposed to purely the color. This type of data structure is termed as RGBA8.

Assuming RGBA8 data, VDC first de-correlates the red and blue channels by computing the differences R-G, designated R', and B-G, designated B'. This results in six channels to encode: R, R', B, B', G, and A. Then for each channel, VDC computes the difference between the channel data and an anchor value. The anchor is encoded as a full 8-bit value. The bit lengths of the computed differences are then encoded as a 3-bit value for each pair of channels. The final compressed size is the sum of the encoded channels G, A, and either R and B or R' and B'. VDC has an acceptable success rate at two-to-one compression.

However, VDC has a limited success rate with higher compression ratios, such as four-to-one compression. An average compression ratio of four-to-one could greatly reduce bandwidth to DRAM, thereby improving computer systems that rely on efficient memory access, such as GPUs.

As the foregoing illustrates, what is needed in the art is a data compression technique with an increased compression ratio.

SUMMARY OF THE INVENTION

One embodiment of the present invention sets forth a subsystem configured to compress digital data, the subsystem comprising an encoding engine configured to receive a first sequence of groups of four bytes of digital data, determine a set of non-zero bytes among the first sequence, determine a position for each non-zero byte included in the set of non-zero bytes among the first sequence, determine a bit length of a set of data bits included in the non-zero bytes included in the set of non-zero bytes, generate a five-bit header based on the number of non-zero bytes, the position of the set of non-zero bytes, and the set of data bits, and append the set of data bits to the header, thereby producing a second sequence that has fewer data bits than the first sequence.

One advantage of the disclosed approach is that paletted compression readily achieves a compression ratio of four-to-one. Employing a five-bit header reduces the overhead bits by applying five bits over four bytes, or 1.25 bits per byte, versus the prior technique which applies three bits over two bites, or 1.5 bits per byte. Further, the paletted approach favors long strings of zeroes by encoding four or eight consecutive zero bytes as the header only. The encoded length using the paletted approach of a 5-bit header per four bytes is typically lower than the corresponding length using the VDC approach of a 5-bit header per two bytes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 is a conceptual enumeration of palettes, according to one embodiment of the present invention; and FIG. 6 is a conceptual enumeration of exemplary data patterns and corresponding palettes, according to one embodiment of the present invention.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
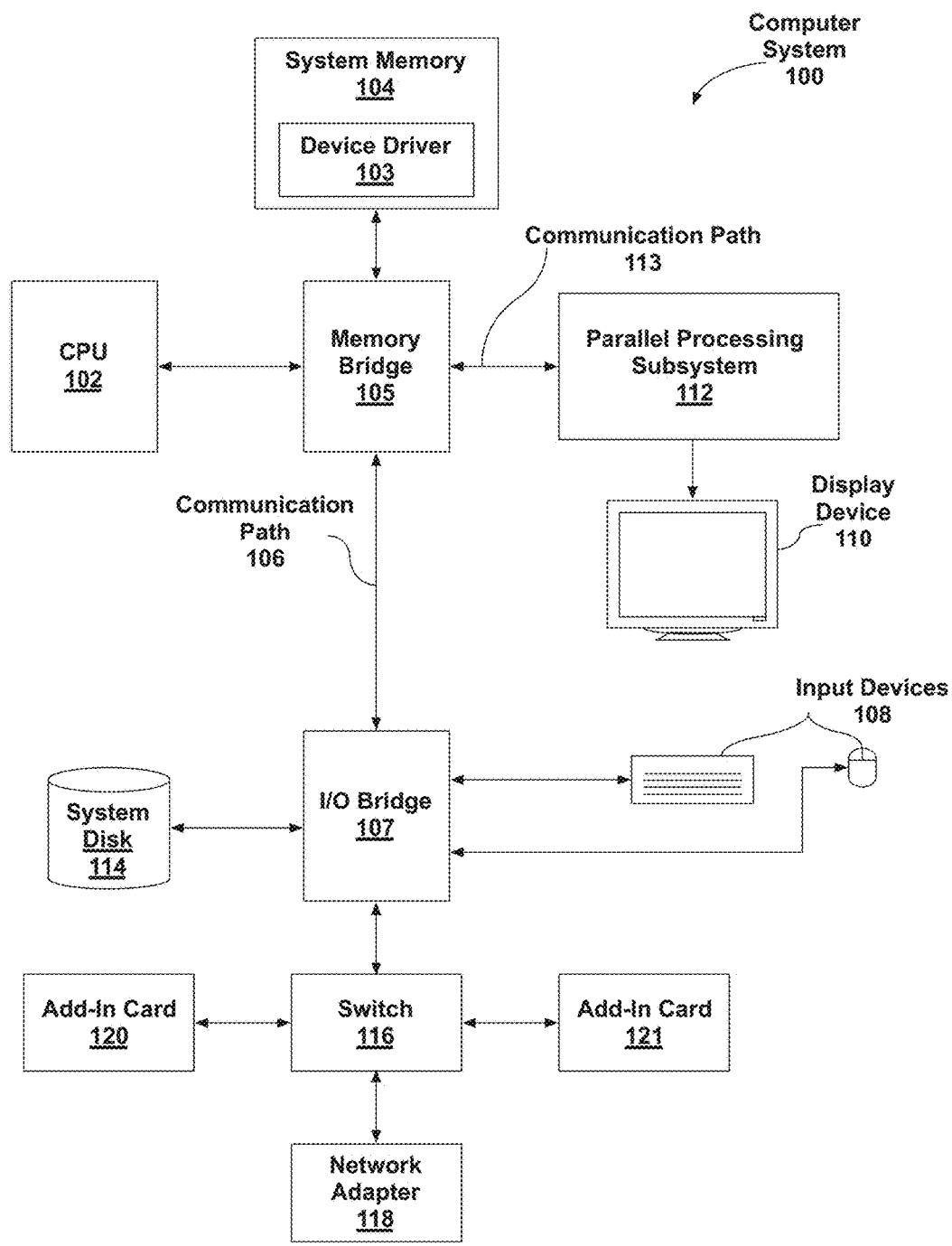
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
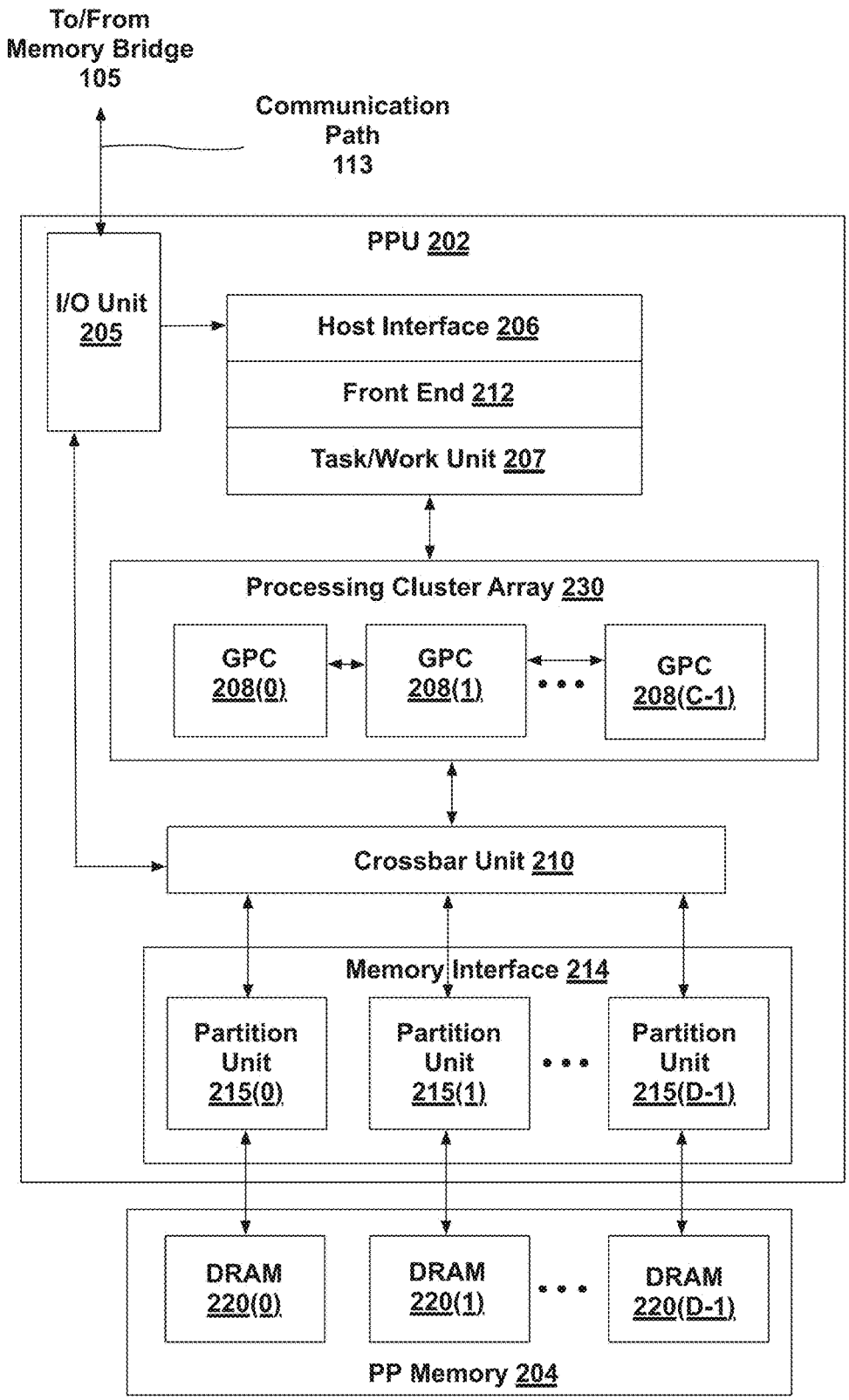
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (CPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system on chip (SoC).

in operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing duster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing dusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The avocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

Figure 3A:
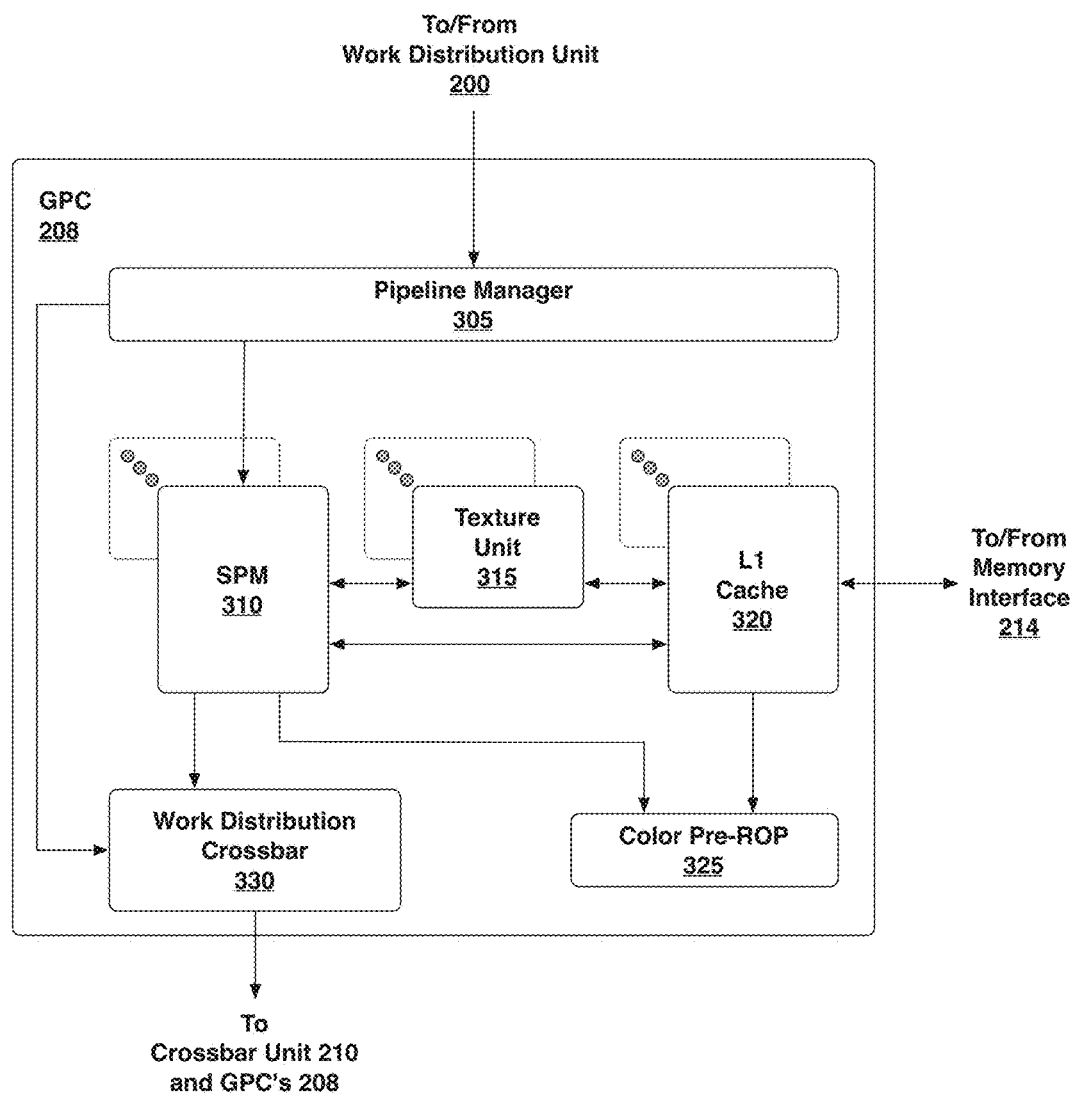
FIG. 3A is a block diagram of a GPC within one of the PPUs of FIG. 2, according to one embodiment of the present invention.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like, Processing Cluster Array Overview FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive dock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPO 208. The physical address is processed to distribute surface data access locality to allow efficient request interleaving among partition units. The cache line index may be used to determine whether or not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPO 208 for further processing or to store the processed task in an L2 cache, parallel processing memory 204, or system memory 104 via crossbar unit 210. A preROP (pre-raster operations) 325 is configured to receive data from SPM 310, direct data to raster operations units (ROP) within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPO 208. Further, while only one GPO 208 is shown, a PPU 202 may include any number of GPCs 208 that are advantageously functionally similar to one another so that execution behavior does not depend on which GPO 208 receives a particular processing task. Further, each GPO 208 advantageously operates independently of other GPCs 208 using separate and distinct processing units, L1 caches, and so on.

Figure 3B:
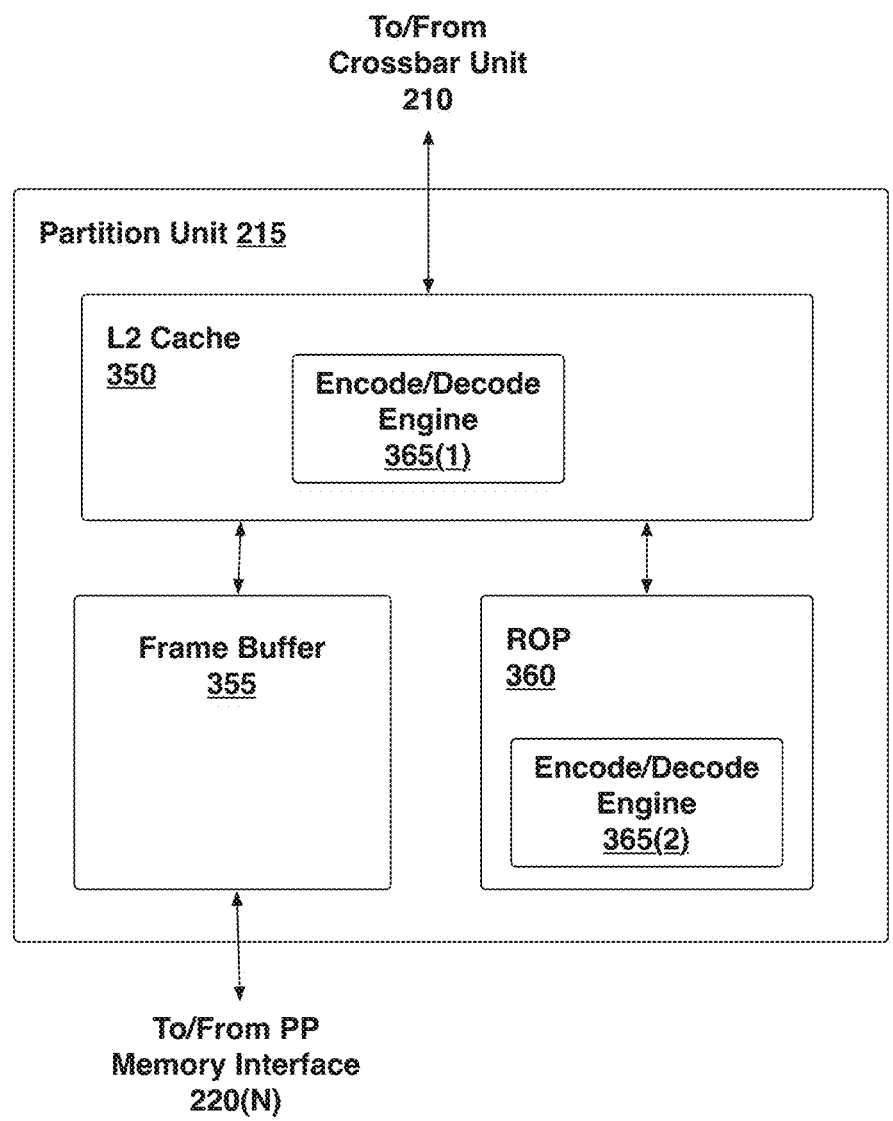
FIG. 3B is a block diagram of a portion of the partition unit of FIG. 2, according to one embodiment of the present invention.

FIG. 3B is a block diagram of a portion of the partition unit of FIG. 2, according to one embodiment of the present invention. As shown, partition unit 215 includes a L2 cache 350, a frame buffer 355, and ROP 360. L2 cache 350 is a read/write cache that is configured to perform load and store operations received from crossbar unit 210 and ROP 360. Read misses and urgent writeback requests are output by L2 cache 350 to frame buffer 355 for processing. Dirty updates are also sent to frame buffer 355 for opportunistic processing. Frame buffer 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data. The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described thus far in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

As also shown in FIG. 3B, partition unit 215 may include one or more instances of an encode/decode engine 365. For example, L2 cache 315 could include an encode/decode engine 365(1), and/or ROP 360 could include an encode/decode engine 365(2). Each instance of encode/decode engine 365 is configured to perform compression and decompression of data that is sent and received, respectively, via crossbar unit 210. For example, encode/decode engine 365(1) with L2 cache 350 could compress data that is written to frame buffer 355 via crossbar unit 210, thereby conserving frame buffer bandwidth. Additionally, encode/decode engine 365(1) could decompress compressed data that is read from frame buffer 355 via crossbar unit 210, likewise conserving frame buffer bandwidth. In another example, encode/decode engine 365(2) within ROP 360 could compress z or color data to be written to memory via crossbar unit 255 or decompress compressed z or color data that is read from memory, similarly conserving frame buffer bandwidth.

Figure 4:
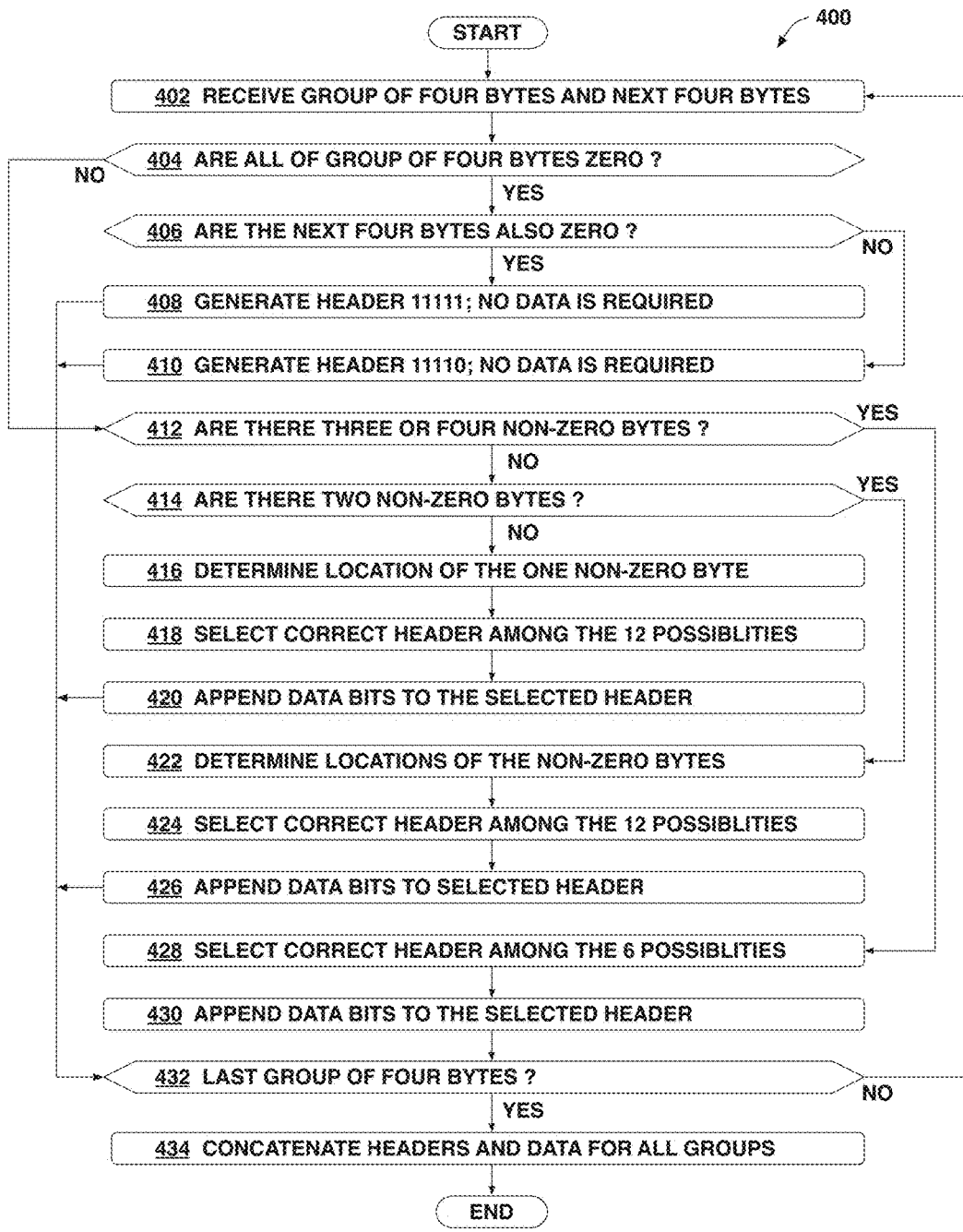
FIG. 4 is a flow diagram of method steps for compressing a data stream, according to one embodiment of the present invention.

As described below in conjunction with FIG. 4, each instance of encode/decode engine 365 is configured to perform data compression and decompression using a technique that relies on a palette encodings. With this technique, the number and position of sequences of zeros are encoded. This technique may allow an average compression ratio of 4:1 to be achieved. FIG. 4 outlines, in stepwise fashion, a compression algorithm implemented within encode/decode engines 365. FIGS. 5-6 set forth an exemplary compression of data performed by an encode/decode engine 365.

Variable Width Data Compression using a Palette of Encodings

FIG. 4 is a flow diagram of method steps for compressing a data stream, according to one embodiment of the present invention. Although the method steps are described in conjunction with the systems of FIGS. 1 through 3B, persons skilled in the art will understand that any system configured to perform the method steps, in any order, is within the scope of the present invention.

Encode/decode engine 365 may perform method 400 on a stream of data bits that results from a decorrelation and differencing of an RGBA8 signal that represents a number of pixels in a video signal. In operation, encode/decode engine 365 first de-correlates the red and blue channels by computing the differences R-G, designated R', and B-G, designated B'. This results in six channels to encode: R, R' B, B', G, and A. For each channel, encode/decode engine computes the difference between the channel data and an anchor value.

Encode/decode engine 365 then examines the data content of sequences of four bytes to identify zero valued bytes. Encode/decode engine assigns to each sequence of four bytes a 5-bit header based on the number of zero valued bytes and the location of zero valued bytes within the sequence. The bit lengths of the computed differences are then encoded and appended to the header. The anchor is encoded as a full 8-bit value. The final compressed size is the sum of the encoded channels G, A, and either R and B or R' and B'.

As shown, a method 400 begins at step 402, where encode/decode engine 365 receives a sequence of four bytes and the subsequent four bytes that follow the sequence. At step 404, encode/decode engine 365 determines if all four bytes are zero. If, at step 404, encode/decode engine 365 determines that all four bytes are not zero, then the method 400 proceeds to step 412.

At step 412, encode/decode engine 365 determines if there are three or four non-zero bytes among the sequence of four. If, at step 412, encode/decode engine 365 determines that there are not three or four non-zero bytes among the sequence of four, then the method 400 proceeds to step 414. At step 414, encode/decode engine 365 determines if there are two non-zero bytes among the sequence of four. If, at step 414, encode/decode engine 365 determines that there are not two non-zero bytes among the sequence of four, then the method 400 proceeds to step 416.

At step 416, encode/decode engine 365 determines the location of the one non-zero byte. In a sequence of four bytes with one non-zero byte, the non-zero byte may occur in one of four locations. The data content of the non-zero byte may be of any length of bits. In order to encode using an 5-bit header, a single non-zero byte with data contents of 3 bits, 5 bits, or 8 bits in length may be encoded, Thus, for three possible bit lengths and four possible locations, there are twelve possible combinations and, accordingly, twelve possible headers. Each header identifies a particular bit length and a particular location among the twelve possible combinations. At step 418 encode/decode engine 365 assigns a five digit binary header from among the twelve possible headers. The twelve possible headers are described in detail below in conjunction with FIG. 5. At step 420, encode/decode engine 365 appends the least significant 3, 5, or all 8 bits of the non-zero byte to the header. The method 400 then proceeds to step 432.

At step 432, encode/decode engine 365 determines if the sequence of four bytes is the last four bytes of the stream of data bits. If at step 432, encode/decode engine 365 determines that the sequence of four bytes is not the last four bytes of the stream of data bits, then the method 400 returns to step 402 where encode/decode engine 365 receives the subsequent four bytes.

If at step 432, encode/decode engine 365 determines that the sequence of four bytes is the last four bytes of the stream of data bits, then the method 400 proceeds to step 434. At step 434, encode/decode engine 365 concatenates all of the accumulated header and data bits. The method 400 then ends.

Returning now to step 414 if, at step 414, encode/decode engine 365 determines that there are two non-zero bytes among the sequence of four, then the method 400 proceeds to step 422. At step 422, encode/decode engine 365 determines the location of the two non-zero bytes In a sequence of four bytes with two non-zero bytes, the non-zero bytes may occur in one of six locations. Further, the data content of the non-zero bytes may be 4 bits, or 6 bits in length. If the data content of the non-zero bytes is 7 bits or 8 bits in length, then the group is encoded as a group of three or four non-zero bytes. Thus, for two possible bit lengths and six possible locations, there are twelve possible combinations and, accordingly, twelve possible headers. Each header identifies a particular bit length and a particular location among the twelve possible combinations. At step 424 encode/decode engine 365 assigns a five digit binary header from among the twelve possible headers. The twelve possible headers are described in detail below in conjunction with FIG. 5. At step 426, encode/decode engine 365 appends the data content of the non-zero bytes to the header. The method 400 then proceeds to step 432, as described above.

Returning now to step 412, if, at step 412, encode/decode engine 365 determines that there are three or four non-zero bytes among the sequence of four, then the method 400 proceeds to step 428. In a sequence of four bytes with three or four non-zero bytes, the data content of the non-zero bytes may be 2 bits, 3 bits, 4 bits, 5 bits, 6 bits, or 8 bits in length. Thus, for six possible bit lengths, there are six possible headers. Each header identifies a particular bit length among the six possible bit lengths. AL step 428, encode/decode engine 365 assigns a five digit binary header from among the six possible headers. The six possible headers are described in detail below in conjunction with FIG. 5. At step 430, encode/decode engine 365 appends the data content of the non-zero bytes to the header. The method 400 then proceeds to step 432, as described above.

Returning now to step 404, if at step 404, encode/decode engine 365 determines that ail four bytes are zero, then the method 400 proceeds to step 406. At step 406, encode/decode engine 365 determines if the subsequent four bytes are zero. If at step 406, encode/decode engine 365 determines that the subsequent four bytes are zero, then the method 400 proceeds to step 408. At step 408, encode/decode engine 365 generates the five bit header 11111. No data is appended to the header. The method 400 then proceeds to step 432, as described above.

Returning now to step 406, if at step 406, encode/decode engine 365 determines that the subsequent four bytes are not zero, then the method 400 proceeds to step 410. At step 410, encode/decode engine 365 generates the five bit header 11110. No data is appended to the header. The method 400 then proceeds to step 432, as described above.

Method 400 describes an algorithm that, when performed by encode/decode engine 365, generates a compressed data stream that includes a sequence of headers and appended data bits and represents the uncompressed source data stream compressed to some ratio, e.g. four-to-one.

FIG. 5 is a conceptual enumeration of palettes, according to one embodiment of the present invention. Encode/decode engine 365 receives a source data stream, that may be include RGBA8 formatted data. Encode/decode engine 365 encodes the source data stream by performing the algorithm described above in conjunction with FIG. 4 on sequences of four consecutive bytes. As shown, rows 501 through 532 describe the thirty-two possible five-bit binary numbers that serve as headers for each sequence of four bytes.

The headers enumerated in rows 501 through 512 each identify a sequence of four bytes that include one non-zero byte. The non-zero byte may include 3 data bits, 5 data bits, or 8 data bits. Further, the non-zero byte may occur in one of four possible locations within the sequence, as shown.

The headers enumerated in rows 513 through 524 each identify a sequence of four bytes that include two non-zero bytes. The non-zero bytes may include 4 data bits or 6 data bits. Further, the two non-zero bytes may occur in one of six possible locations within the sequence, as shown.

The headers enumerated in rows 525 through 530 each identify a sequence of four bytes that include either three or four non-zero bytes. The non-zero bytes may include 2 data bits, 3 data bits, 4 data bits, 5 data bits, 6 data bits or 8 data bits.

The header shown in row 32 identifies a sequence of four bytes in which all four bytes are zero valued when the subsequent sequence of four bytes also includes four zero valued bytes. The header shown in row 31 identifies a sequence of four bytes in which all four bytes are zero valued when the subsequent sequence of four bytes also includes at least one non-zero byte.

FIG. 6 is a conceptual enumeration of exemplary data patterns and corresponding palettes, according to one embodiment of the present invention. In operation, encode/decode engine 365 receives an uncompressed RGBA8 video data stream and decorrelates four-byte sequences. Encode/decode engine 365 then computes the difference between each four-byte sequence and the source data shown in row 601, which serves as an anchor value. As shown, the source data enumerated in rows 601 through 632 represents the resultant decorrelated, differenced four-byte sequences. The source data is represented as hexadecimal characters where two hexadecimal characters form one byte.

Row 601 describes source data that includes three non-zero bytes with eight-bit data length. To compress the source data shown in row 601, encode/decode engine 365 first assigns 11101 as the header, as also illustrated in row 530 above in conjunction with FIG. 5. Encode/decode engine 365 then appends the full four bytes, that is, 32 bits, of data to the 5 header bits. The compressed output then includes 37 bits to represent the uncompressed 32 data bits, thus, imposing an increase in bit length of 5 bits. The increase is a result of the initial encoding of the anchor value in the first four byte sequence.

Row 602 describes source data that includes four zero valued bytes. Further, the source data shown in row 602 is followed by the source data shown in row 603, which also includes four zero valued bytes. To compress the source data shown in row 602 and 603, encode/decode engine 365 first assigns 11111 as the header, as also illustrated in row 532 above in conjunction with FIG. 5. As the source data includes only zeroes, encode/decode engine 365 does not append any data bits to the 5 header bits. The compressed output shown in rows 602 and 603 then includes a total of 5 bits to represent the uncompressed 64 data bits, thus, achieving a reduction of 59 bits.

Row 604 describes source data that includes two non-zero bytes with four-bit data length. The non-zero bytes are located in the third and fourth position within the sequence. To compress the source data shown in row 604, encode/decode engine 365 assigns 01100 as the header, as also illustrated in row 513 above in conjunction with FIG. 5. Encode/decode engine 365 then appends the data content of the two bytes, that is, 8 bits, to the 5 header bits. The compressed output shown in row 604 then includes 13 bits to represent the uncompressed 32 data bits, thus, achieving a reduction of 19 bits.

Row 605 describes source data that includes four zero valued bytes. Further, the source data shown in row 605 is followed by the source data shown in row 606, which also includes four zero valued bytes. To compress the source data shown in row 605 and 606, encode/decode engine 365 first assigns 11111 as the header, as also illustrated In row 532 above in conjunction with FIG. 5. As the source data includes only zeroes, encode/decode engine 365 does not append any data bits to the 5 header bits. The compressed output shown in rows 605 and 606 then includes a total of 5 bits to represent the uncompressed 64 data bits, thus, achieving a reduction of 59 bits.

Row 607 describes source data that includes four zero valued bytes. However, the four succeeding bytes are not all zero valued bytes. Therefore, to compress the source data shown in row 607, encode/decode engine 365 first assigns 11110 as the header, as also illustrated in row 531 above in conjunction with FIG. 5. As the source data includes only zeroes, encode/decode engine 365 does not append any data bits to the 5 header bits. The compressed output shown in row 607 then includes a total of 5 bits to represent the uncompressed 32 data bits, thus, achieving a reduction of 27 bits.

Row 608 describes source data that includes three non-zero bytes with five-bit data length. To compress the source data shown in row 608, encode/decode engine 365 first assigns 11011 as the header, as also illustrated in row 528 above in conjunction with FIG. 5. Encode/decode engine 365 then appends the data content of the three bytes, that is, 20 bits, to the 5 header bits. The compressed output shown in row 608 then includes 25 bits to represent the uncompressed 32 data bits, thus, achieving a reduction of 7 bits.

Row 609 describes source data that includes one non-zero byte with five-bit data length. The non-zero byte is located in the fourth position within the sequence. To compress the source data shown in row 609, encode/decode engine 365 first assigns 00100 as the header, as also illustrated in row 505 above in conjunction with FIG. 5. Encode/decode engine 365 then appends the 5 data bits to the 5 header bits. The compressed output shown in row 609 then includes 10 bits to represent the uncompressed 32 data bits, thus, achieving a reduction of 22 bits.

Row 610 describes source data that includes two non-zero bytes with four-bit data length. The non-zero bytes are located in the second and third position within the sequence. To compress the source data shown in row 610, encode/decode engine 365 first assigns 01110 as the header, as also illustrated in row 515 above in conjunction with FIG. 5. Encode/decode engine 365 then appends the data content of the two bytes, that is, 8 bits, to the 5 header bits. The compressed output shown in row 610 then includes 13 bits to represent the uncompressed 32 data bits, thus, achieving a reduction of 19 bits.

Row 611 describes source data that includes one non-zero byte with five-bit data length. The non-zero byte is located in the fourth position within the sequence. To compress the source data shown in row 611, encode/decode engine 365 first assigns 00100 as the header, as also illustrated in row 505 above in conjunction with FIG. 5. Encode/decode engine 365 then appends the 5 data bits to the 5 header bits. The compressed output shown in row 611 then includes 10 bits to represent the uncompressed 32 data bits, thus, achieving a reduction of 22 bits.

Row 612 describes source data that includes four zero valued bytes. However, the four succeeding bytes are not all zero valued bytes. Therefore, to compress the source data shown in row 612, encode/decode engine 365 first assigns 11110 as the header, as also illustrated in row 531 above in conjunction with FIG. 5. As the source data includes only zeroes, encode/decode engine 365 does not append any data bits to the 5 header bits. The compressed output shown in row 612 then includes a total of 5 bits to represent the uncompressed 32 data bits, thus, achieving a reduction of 27 bits.

Row 613 describes source data that includes one non-zero byte with five-bit data length. The non-zero byte is located in the fourth position within the sequence. To compress the source data shown in row 613, encode/decode engine 365 first assigns 00100 as the header, as also illustrated in row 505 above in conjunction with FIG. 5. Encode/decode engine 365 then appends the 5 data bits to the 5 header bits. The compressed output shown in row 613 then includes 10 bits to represent the uncompressed 32 data bits, thus, achieving a reduction of 22 bits.

Row 614 describes source data that includes two non-zero bytes with six-bit data length. The non-zero bytes are located in the first and second position within the sequence. To compress the source data shown in row 614, encode/decode engine 365 first assigns 10111, as also the header as illustrated in row 524 above in conjunction with FIG. 5. Encode/decode engine 365 then appends the data content of the two bytes, that is, 12 bits, to the 5 header bits. The encoded output shown in row 614 includes 5 header bits and 12 data bits for the 4-byte sequence. Thus, the encoded output includes 17 bits for the 32 bit input, realizing a reduction of 15 bits.

Row 615 describes source data that includes one non-zero byte with five-bit data length. The non-zero byte is located in the fourth position within the sequence. To compress the source data shown in row 615, encode/decode engine 365 assigns 00100 as the header, as also illustrated in row 505 above in conjunction with FIG. 5. Encode/decode engine 365 then appends the 5 data bits to the 5 header bits. The compressed output shown in row 615 then includes 10 bits to represent the uncompressed 32 data bits, thus, achieving a reduction of 22 bits.

Row 616 describes source data that includes one non-zero byte with three-bit data length. The non-zero byte is located in the third position within the sequence. To compress the source data shown in row 616, encode/decode engine 365 first assigns 00001 as the header, as also illustrated in row 502 above in conjunction with FIG. 5. Encode/decode engine 365 then appends the 3 data bits to the 5 header bits. The compressed output shown in row 616 then includes 8 bits to represent the uncompressed 32 data bits, thus, achieving a reduction of 24 bits.

Row 617 describes source data that includes four zero valued bytes. Further, the source data shown in row 617 is followed by the source data shown in row 618, which also includes four zero valued bytes. To compress the source data shown in row 617 and 618, encode/decode engine 365 first assigns 11111 as the header, as also illustrated in row 532 above in conjunction with FIG. 5. As the source data includes only zeroes, encode/decode engine 365 does not append any data bits to the 5 header bits. The compressed output shown in rows 617 and 618 then includes a total of 5 bits to represent the uncompressed 64 data bits, thus, achieving a reduction of 59 bits.

Row 619 describes source data that includes two non-zero bytes with four-bit data length. The non-zero bytes are located in the second and third position within the sequence. To compress the source data shown in row 619, encode/decode engine 365 first assigns 01110, as also the header as illustrated in row 515 above in conjunction with FIG. 5. Encode/decode engine 365 then appends the data content of the two bytes, that is, 8 bits, to the 5 header bits. The compressed output shown in row 619 then includes 13 bits to represent the uncompressed 32 data bits, thus, achieving a reduction of 19 bits.

Row 620 describes source data that includes four zero valued bytes. Further, the source data shown in row 620 is followed by the source data shown in row 621, which also includes four zero valued bytes. To compress the source data shown in row 620 and 621, encode/decode engine 365 first assigns 11111 as the header, as also illustrated in row 532 above in conjunction with FIG. 5. As the source data includes only zeroes, encode/decode engine 365 does not append any data bits to the 5 header bits. The compressed output shown in rows 620 and 621 then includes a total of 5 bits to represent the uncompressed 64 data bits, thus, achieving a reduction of 59 bits.

Row 622 describes source data that includes two non-zero bytes with four-bit data length. The non-zero bytes are located in the third and fourth position within the sequence. To compress the source data shown in row 622, encode/decode engine 365 first assigns 01100 as the header, as also illustrated in row 513 above in conjunction with FIG. 5. Encode/decode engine 365 then appends the data content of the two bytes, that is, 8 bits, to the 5 header bits. The compressed output shown in row 622 then includes 13 bits to represent the uncompressed 32 data bits, thus, achieving a reduction of 19 bits.

Row 623 describes source data that includes one non-zero byte with three-bit data length. The non-zero byte is located in the fourth position within the sequence. To compress the source data shown in row 623, encode/decode engine 365 first assigns 00000, as also the header as illustrated in row 501 above in conjunction with FIG. 5. Encode/decode engine 365 then appends the 3 data bits to the 5 header bits. The compressed output shown in row 623 then includes 8 bits to represent the uncompressed 32 data bits, thus, achieving a reduction of 24 bits.

Row 624 describes source data that includes one non-zero byte with five-bit data length. The non-zero byte is located in the fourth position within the sequence. To compress the source data shown in row 624, encode/decode engine 365 first assigns 00100 as the header, as also illustrated in row 505 above in conjunction with FIG. 5. Encode/decode engine 365 then appends the 5 data bits to the 5 header bits. The compressed output shown in row 624 then includes 10 bits to represent the uncompressed 32 data bits, thus, achieving a reduction of 22 bits.

The achievable compression ratio for an RGBA8 data stream is dependent on data content. For example, a stream of video data that represents a slowly changing scene may include more zero values, after decorrelation and differencing are performed, versus a scene that may include rapid movement or rapidly changing backgrounds.

Sequences of bytes that include many zero valued bytes may be compressed in a more efficient manner in comparison with sequences that include many non-zero valued bytes. For example, as illustrated above in conjunction with rows 602 and 603, eight successive zero valued bytes are encoded by the single 5 bit header, for a ratio of 64-to-5, or 12.8-to-1. In comparison, the anchor data illustrated above in conjunction with row 601 incurs a penalty due to the necessity to append all 32 data bits to the 5 bit header.

The compression ratio for a particular algorithm is, thus, typically derived as an average compression ratio over some representative collection of data sequences. The exemplary data patterns illustrated in FIG. 6 include twenty-four four-byte sequences for a total of 768 bits of uncompressed data. The compression algorithm generates twenty 5-bit headers for a total of 100 header bits, along with 127 appended data bits. Thus, the algorithm generates 227 bits of compressed data, for a compression ratio of 768-to-227, or 3.38-to-1 for the exemplary data patterns illustrated in FIG. 6, In sum, a subsystem configured to encode an RGBA8 data stream assembles sequences of groups of four bytes from the data stream. The subsystem decorrelates the red and blue channels, and computes a difference between each four-byte group and an anchor value. The anchor is encoded at full value. The subsystem then assigns each group a five-bit header based on the number and location of non-zero bytes and on the data content of the non-zero bytes within the group. The subsystem favors zero valued bytes. Thus, when a group includes only zero valued bytes, the header is sufficient to encode the group; no data bits are necessary. Further, two successive groups of zero-valued bytes may be encoded as a single header with no data bits, achieving further data reduction. Finally, the subsystem concatenates all the headers with associated data to yield the source data stream compressed to some ratio, e.g. four-to-one.

At least one advantage of the subsystems disclosed herein is that paletted compression can more readily achieve a compression ratio of four-to-one, which is rarely seen be other approaches. The reduction in the number of data bits reduces the amount of memory storage required. Further, paletted compression enhances the speed of data transmission to and from DRAM cache and the on-chip processing. The enhanced data transmission affords more efficient processor utilization and improves system optimization.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions While the preceding is directed to embodiments of the present disclosure, other and further embodiments of the disclosure may be devised without departing from the basic scope thereof, and the scope thereof is determined by the claims that follow.

The invention claimed is:

1. A subsystem configured to compress digital data, the subsystem comprising:
   a memory that stores digital data; and
   an encoding engine that is coupled to the memory and:
      receives a first sequence of M bytes of the digital data,
      determines a set of non-zero bytes included in the first sequence,
      determines, for each non-zero byte included in the set of non-zero bytes, a position of each non-zero byte in the first sequence,
      determines, for a set of data bits representing the non-zero bytes included in the set of non-zero bytes, a bit length of the set of data bits, wherein the bit length represents the number of bits necessary to represent an integer value represented by the set of data bits,
      assigns a first N-bit header from a plurality of pre-determined N-bit headers, wherein the assignment of the first N-bit header is based on the number of non-zero bytes included in the set of non-zero bytes, the position of each non-zero byte in the first sequence, and the bit length of the set of data bits, and
      appends the set of data bits to the N-bit header to produce a second sequence of bytes that includes fewer data bits than the first sequence of M bytes.

2. The subsystem of claim 1, wherein the set of non-zero bytes comprises one non-zero byte.

3. The subsystem of claim 2, wherein the position of the one non-zero byte included in the set of non-zero bytes comprises one of M positions included in the first sequence of M bytes.

4. The subsystem of claim 2, wherein the bit length of the set of data bits included in the one non-zero byte included in the set of non-zero bytes comprises one bit length of three possible bit lengths.

5. The subsystem of claim 1, wherein the set of non-zero bytes comprises two non-zero bytes.

6. The subsystem of claim 5, wherein the position of the two non-zero bytes included in the set of non-zero bytes comprises one of M choose 2 positions included in the first sequence of M bytes.

7. The subsystem of claim 5, wherein the bit length of the set of data bits included in the two non-zero bytes included in the set of non-zero bytes comprises one bit length of two possible bit lengths.

8. The subsystem of claim 1, wherein the set of non-zero bytes among the first sequence comprises three or four non-zero bytes.

9. The subsystem of claim 8, wherein the bit length of the set of data bits included in the three or four non-zero bytes included in the set of non-zero bytes comprises one bit length of six possible bit lengths.

10. The subsystem of claim 1, wherein the encoding engine is further configured to assign the N bit header by assigning a 5-bit header from a plurality of pre-determined 5-bit headers based on:
    the number of non-zero bytes included in the set of non-zero bytes,
    the position of each non-zero byte in the first sequence, and
    the bit length of the set of data bits.

11. A computer-implemented method for compressing digital data, the method comprising:
    receiving a first sequence of M bytes of digital data,
    determining a set of non-zero bytes included in the first sequence,
    determining, for each non-zero byte included in the set of non-zero bytes, a position of each non-zero byte in the first sequence,
    determining, for a set of data bits representing the non-zero bytes included in the set of non-zero bytes, a bit length of the set of data bits, wherein the bit length represents the number of bits necessary to represent an integer value represented by the set of data bits,
    assigns a first N-bit header from a plurality of pre-determined N-bit headers, wherein the assignment of the first N-bit header is based on the number of non-zero bytes included in the set of non-zero bytes, the position of each non-zero byte in the first sequence, and the bit length of the set of data bits, and
    appending the set of data bits to the N-bit header, to produce a second sequence of bytes that includes fewer data bits than the first sequence of M bytes.

12. The computer-implemented method of claim 10, wherein the set of non-zero bytes comprises one non-zero byte.

13. The computer-implemented method of claim 12, wherein the position of the one non-zero byte included in the set of non-zero bytes comprises one of four positions included in the sequence of M bytes.

14. The computer-implemented method of claim 12, wherein the bit length of the set of data bits included in the one non-zero byte included in the set of non-zero bytes comprises one bit length of possible three bit lengths.

15. The computer-implemented method of claim 10, wherein the set of non-zero bytes among the first sequence comprises two non-zero bytes.

16. The computer-implemented method of claim 15, wherein the position of the two non-zero bytes included in the set of non-zero bytes comprises one of M choose 2 positions included in the first sequence of M bytes.

17. The computer-implemented method of claim 15, wherein the bit length of the set of data bits included in the two non-zero bytes included in the set of non-zero bytes comprises one bit length of two possible bit lengths.

18. The computer-implemented method of claim 10, wherein the set of non-zero bytes among the first sequence comprises three or four non-zero bytes.

19. The computer-implemented method of claim 18, wherein the bit length of the set of data bits included in the three or four non-zero bytes included in the set of non-zero bytes comprises one bit length of six possible bit lengths.

20. A computing device configured to compress digital data, comprising:
    a partition unit that includes:
        an encoding engine that:
            receives a first sequence of M bytes of the digital data,
            determines a set of non-zero bytes included in the first sequence,
            determines, for each non-zero byte included in the set of non-zero bytes, a position of each non-zero byte in the first sequence,
            determines, for a set of data bits representing the non-zero bytes included in the set of non-zero bytes, a bit length of the set of data bits, wherein the number of bits necessary to represent an integer value represented by the set of data bits,
            assigns a first N-bit header from a plurality of pre-determined N-bit headers, wherein the assignment of the first N-bit header is based on the number of non-zero bytes included in the set of non-zero bytes, the position of each non-zero byte in the first sequence, and the bit length of the set of data bits, and
            appends the set of data bits to the N-bit header, to produce a second sequence of bytes that includes fewer data bits than the first sequence of M bytes.

21. The computing device of claim 20, wherein the encoding engine resides within a cache unit included in the partition unit, or the encoding engine resides within a rasterization unit included in the partition unit.

* * * * *